(12) United States Patent
Gusikhin et al.

(10) Patent No.: US 11,720,398 B2
(45) Date of Patent: Aug. 8, 2023

(54) HARVESTING VEHICLE HARDWARE ACCELERATORS AND GPU COMPUTING CAPABILITIES WHEN IDLE

(71) Applicant: Ford Global Technologies, LLC, Dearborn, MI (US)

(72) Inventors: Oleg Yurievitch Gusikhin, Commerce Township, MI (US); Omar Makke, Lyon Township, MI (US); John Howard Schneider, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 16/836,774

(22) Filed: Mar. 31, 2020

(65) Prior Publication Data
US 2021/0303343 A1 Sep. 30, 2021

(51) Int. Cl.
*G06F 9/48* (2006.01)
*G06F 9/50* (2006.01)
(Continued)

(52) U.S. Cl.
CPC ............ *G06F 9/4881* (2013.01); *B60L 58/12* (2019.02); *G06F 9/3877* (2013.01); *G06F 9/5038* (2013.01); *G06F 9/5072* (2013.01)

(58) Field of Classification Search
CPC . G06F 9/46–5094; G06F 9/3877; B60L 58/12
See application file for complete search history.

(56) References Cited

U.S. PATENT DOCUMENTS 7,894,951 B2 2/2011 Norris et al.
8,266,075 B2 9/2012 Ambrosio et al.
(Continued)

FOREIGN PATENT DOCUMENTS

KR 101957343 B1 * 3/2019
WO 2011-110924 A1 9/2011
(Continued)

OTHER PUBLICATIONS

A Smart Power Meter to Recharge Electric Vehicles in Communal Parking Areas Rubén Muñiz , Juan Díaz , Member, IEEE, Fernando Nuño (Year: 2019).*

(Continued)

*Primary Examiner* — Emerson C Puente
*Assistant Examiner* — Paul V Mills
(74) *Attorney, Agent, or Firm* — Brandon Hicks; Kilpatrick Townsend & Stockton LLP (57) ABSTRACT

Harvesting the high performance computing capabilities of vehicle processors while the vehicles are parked and/or charging may provide use to otherwise unused resources as well as offer a way to discount parking and/or charging costs for the vehicle owner/driver. To harvest the computing capabilities, a dispatcher is utilized that receives incoming complex processing requests and parses the requests into tasks. The dispatcher dispatches the tasks to vehicle processors that are within, for example, a parking garage to which the dispatcher has access. The dispatcher may prioritize requests and/or prioritize the vehicle processors to distribute the tasks to optimize the power consumption, time, and processing capabilities used. When the vehicle processors complete the tasks and return results to the dispatcher, the dispatcher finalizes the job results and provides the results to the requestor. The dispatcher may discount the parking (Continued)

and/or charging costs for the vehicles that performed the computational tasks.

19 Claims, 8 Drawing Sheets

(51) Int. Cl.
  *B60L 58/12* (2019.01)
  *G06F 9/38* (2018.01)

(56) References Cited

U.S. PATENT DOCUMENTS

| | | | |
|---|---|---|---|
| 8,418,824 B2 | 4/2013 | Aguilar | |
| 9,679,490 B2 | 6/2017 | Ceribelli et al. | |
| 10,078,520 B1* | 9/2018 | Chirayath Kuttan | ................... G06F 9/3851 |
| 2011/0215758 A1* | 9/2011 | Stahlin | ................... H04B 3/542 320/109 |
| 2013/0046525 A1 | 2/2013 | Ali et al. | |
| 2013/0304863 A1* | 11/2013 | Reber | ................... H04W 4/80 709/218 |
| 2015/0081156 A1 | 3/2015 | Trepagnier et al. | |
| 2015/0154056 A1* | 6/2015 | Chen | ................... G06F 9/4856 718/103 |
| 2015/0346727 A1 | 12/2015 | Ramanujam | |
| 2017/0084096 A1* | 3/2017 | Hui | ................... G08G 1/0112 |
| 2019/0121661 A1* | 4/2019 | Kanada | ................... H02J 7/14 |
| 2020/0313959 A1* | 10/2020 | Higuchi | ................... H04L 67/12 |
| 2021/0094436 A1* | 4/2021 | Weber | ................... B60L 55/00 |
| 2021/0316632 A1* | 10/2021 | Hauschild | ................... G06F 9/5066 |

FOREIGN PATENT DOCUMENTS

| | | |
|---|---|---|
| WO | 2011-156776 A3 | 4/2012 |
| WO | 2017-083847 A1 | 5/2017 |

OTHER PUBLICATIONS

Parked Vehicular Computing for Energy-Efficient Internet of Vehicles: A Contract Theoretic Approach Chunhai Li, Siming Wang, Xumin Huang, (Year: 2019).*
Power, Performance and Energy Models and Systems for Emergent Architectures Shuaiwen Song Chapter 1 and 2 (Year: 2013).*
Optimal Task Allocation in Vehicular Fog Networks Requiring URLLC: An Energy-Aware Perspective Tingting Liu and Feng Shu (Year: 2019).*
Vehicle as a Resource (VaaR) Sherin Abdelhamid, Hossam S. Hassanein, and Glen Takahara (Year: 2015).*
Vehicular datacenter modeling for cloud computing: Considering capacity and leave rate of vehicles Taesik Kim, Hong Min, Jinman Jung (Year: 2018).*
Analysis on Characteristics of Vehicle and Parking Lot as a Datacenter Taesik Kim, Hong Min, Jinman Jung, Jisu Park, Jaeuk Lee (Year: 2017).*
Energy Efficient Software Matching in Vehicular Fog Rui Ma, Amal A. Alahmadi, Taisir E. H. El-Gorashi, and Jaafar M. H. Elmirghani (Year: 2019).*
Toward Approximating Job Completion Time in Vehicular Clouds Ryan Florin and Stephan Olariu (Year: 2018).*
Supporting Big Data At the Vehicular Edge Lloyd Decker (Year: 2018).*
The Next Paradigm Shift: From Vehicular Networks To Vehicular Clouds Stephan Olariu, Tihomir Hristov, and Gongjun Yan Chapter 19 of "Mobile Ad Hoc Networking: Cutting Edge Directions." (Year: 2013).*
Big Data in the Parking Lot Ryan Florin, Syedmeysam Abolghasemi, Aida Ghazi Zadeh, and Stephan Olariu Chapter 21 of "Big Data Management and Processing" (Year: 2017).*
Leverage Parking Cars in a Two-tier Data Center Lin Gu, Deze Zeng, Song Guo, Baoliu Ye (Year: 2013).*

* cited by examiner

HARVESTING VEHICLE HARDWARE ACCELERATORS AND GPU COMPUTING CAPABILITIES WHEN IDLE

BACKGROUND

Electric, hybrid, and autonomous vehicles may be equipped with high performance computational processors such as graphic processing units (GPUs), multiply and accumulate (MAC) units, and field programmable gate arrays (FPGAs), all of which can process significant numbers of parallel computations per second. While these vehicles are parked and/or charging, these processors are typically otherwise dormant. At the same time, high performance computing is an industry that is in need of high performance computational processors. Accordingly, techniques and systems are needed that make resources available to the high performance computing industry.

SUMMARY

In some embodiments, techniques and systems are provided to harvest the high performance computing capabilities of vehicle processors while the vehicles are parked and/or charging such that the processors are otherwise idle. Specifically, a dispatcher is utilized that receives incoming complex processing requests and parses the requests into tasks. The dispatcher may dispatch the tasks to vehicle processors that are within, for example, a parking garage to which the dispatcher has access. The dispatcher may prioritize requests and/or prioritize the vehicle processors to distribute the tasks. When the vehicle processors complete the tasks and return results to the dispatcher, the dispatcher may finalize the job results and provide the results to the requestor.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for harvesting vehicle computational power capabilities while the vehicles are parked and/or charging and the vehicle processors are otherwise idle. The method includes a dispatcher receiving a request for processing a job. The dispatcher also receives availability information for vehicle processors including the number of cores for each of the vehicle processors. The dispatcher parses the job into tasks and distributes them to the vehicle processors based at least in part on the availability information. The dispatcher also receives the results of the tasks from the vehicle processors. Other embodiments of this aspect include corresponding computer systems, apparatus, and computer programs recorded on one or more computer storage devices, each configured to perform the actions of the methods.

Implementations may include one or more of the following features. In some embodiments, the vehicle processors are distributed across vehicles that are charging, and the dispatcher communicates with the vehicles via a charging cable. In some embodiments, the vehicle processors include graphic processing units, multiply and accumulate units, or field programmable gate arrays. In some embodiments, distributing the tasks includes identifying a vehicle having a vehicle processor to distribute one or more of the tasks to, providing a graphical user interface to the driver's mobile device, where the graphical user interface includes a request for access to the vehicle processor, and receiving, via the graphical user interface, consent from the driver to access the vehicle processor. In some embodiments, the vehicle is charging and communicating with the dispatcher via a charging cable, and the graphical user interface further includes an offer to reduce the cost of charging the vehicle in exchange for access to the vehicle processor. In some embodiments, the first vehicle is charging, and the graphical user interface further includes a charging state of the vehicle. In some embodiments, the availability information further includes, for each vehicle processor, the type of the vehicle processor, a schedule of the vehicle processor, and/or a battery charge of the vehicle. In some embodiments, the vehicle includes at least two vehicle processors and a central module, and the dispatcher receives the availability information for the two vehicle processors from the central module. In some embodiments, the vehicle processors are distributed across vehicles that are charging, and distributing the tasks to the vehicle processors includes prioritizing vehicle processors based on the charge status of the vehicle associated with the vehicle processor. In some embodiments, distributing the tasks to the vehicle processors includes prioritizing vehicle processors based on the number of cores of the vehicle processor. In some embodiments, the dispatcher detects that a vehicle processor ceased communication after a task was distributed to the vehicle processor, and the vehicle processor did not complete the task before ceasing communication. The dispatcher may redistribute the task to a different vehicle processor. In some embodiments, the dispatcher may generate an availability model for a completion time of the job. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

As discussed above, disclosed herein are systems and techniques for harvesting idle high performance computational vehicle processors. Autonomous vehicles as well as some electric and hybrid vehicles and even some vehicles having driver assist features have high performance computational processors such as graphic processing units (GPUs), field programmable gate arrays (FPGAs), and multiply and accumulate (MAC) units. When these vehicles are parked and/or when the vehicles are plugged into a charging unit, the idle processors may be harvested to process other jobs or tasks that can be processed in a parallel computing environment. Specifically, a dispatcher may oversee a particular parking garage, parking location, and/or charging facility. The dispatcher can receive requests for complex jobs and parse the jobs into tasks that may be distributed to the processors in the parked and/or charging vehicles. The vehicles may execute the tasks and return the results to the dispatcher. The dispatcher can finalize the results of the job and return the results to the requestor.

Figure 1:
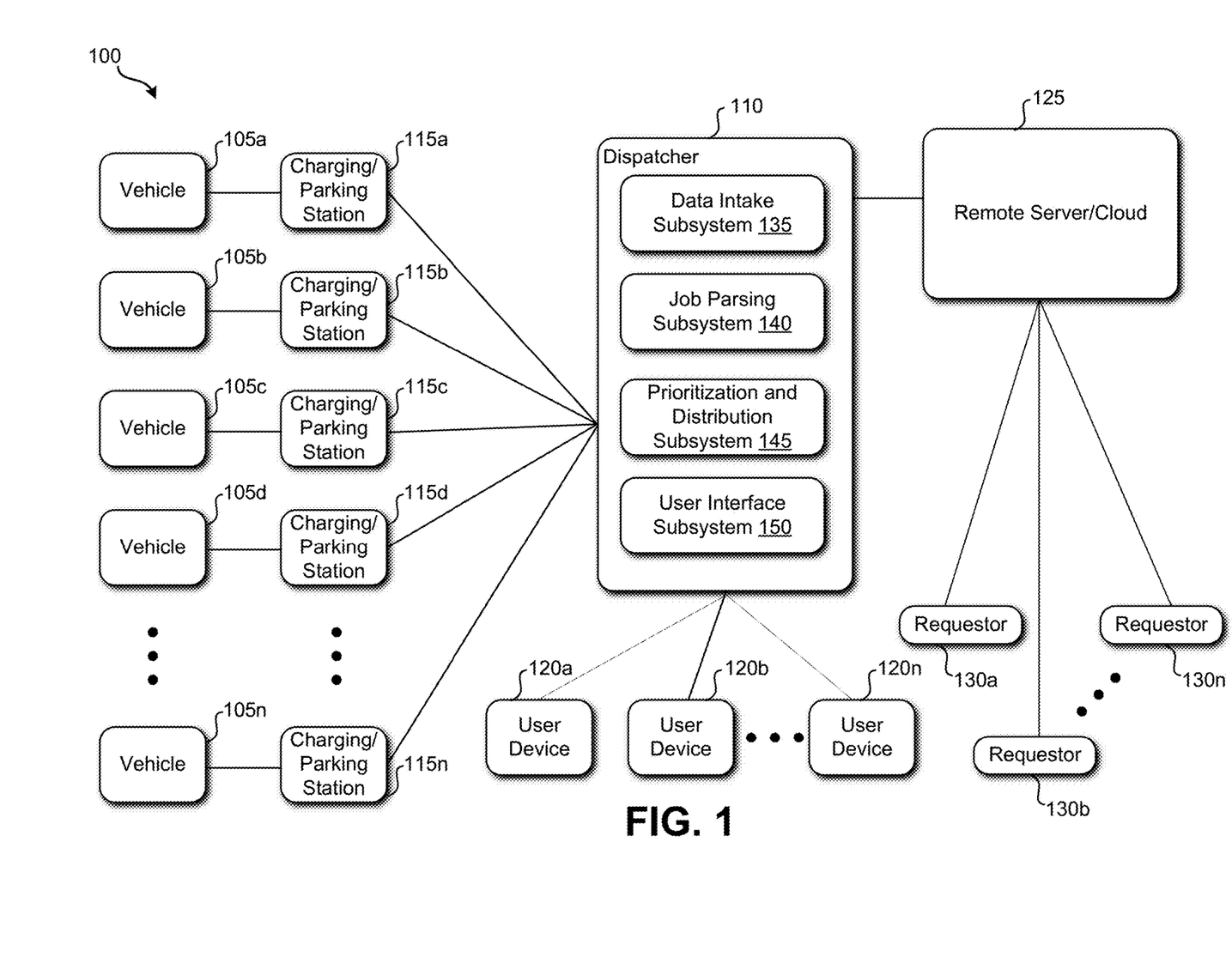
FIG. 1 illustrates an example of a processor harvesting system, according to some embodiments.

Turning to FIG. 1, illustrates an example processor harvesting system 100. The processor harvesting system 100 includes vehicles 105, charging/parking stations 115, dispatcher 110, user devices 120, remote server 125, and requestors 130.

Vehicles 105 include one or more vehicles having high performance computational processors. Such vehicles 105 may include autonomous vehicles, hybrid electric vehicles, electric vehicles, or any other vehicle having one or more high performance computational processors, such as a vehicle that has an advanced driver assist system. High performance computational processors include, for example, graphic processing units (GPUs), field programmable gate arrays (FPGAs), multiply and accumulate (MAC) units, among other high performance computational processors. These high performance computational processors are capable of processing a significant number of parallel computations per second. Any number of vehicles may be included in harvesting system 100 as depicted by vehicles 105a through 105n. Vehicles may include one or more computing devices such as computing device 700 as depicted with respect to FIG. 7 such that vehicle 105 includes, in addition to high performance computational processors, other processors, memory, and the like.

Charging/parking stations 115 may be in a parking structure (e.g., a parking garage), in a parking lot, available at street parking, and the like. The charging/parking stations 115 may be a charging station for the vehicle 105 into which a charging cable is plugged. In some embodiments, charging/parking stations 115 charge a vehicle wirelessly. In some embodiments, charging/parking stations 115 are parking stations with which vehicle 105 may communicate via a wired or wireless connection. As a parking station, charging/parking station 115 may provide parking services (e.g., payment options associated with the space the vehicle 105 is parked in) without providing charging services to vehicle 105. There may be any number of charging/parking stations 115 in harvesting system 100 as depicted by charging/parking stations 115a through 115n. Charging/parking stations 115 may be or include one or more computing devices such as computing device 700 as depicted with respect to FIG. 7.

Dispatcher 110 may be the dispatcher that oversees the charging/parking stations 115. For example, there may be a dispatcher 110 that oversees the charging/parking stations 115 in a parking garage, a single floor of a parking garage, a parking lot, a portion of city street parking, or the like. The dispatcher 110 may have a wired or wireless communication link with each charging/parking station 115. The dispatcher 110 may receive information for each of the vehicles 105 from the charging/parking stations 115. The dispatcher 110 may also receive and provide information to the owners/drivers of the vehicles 105 via the user devices 120. The dispatcher further may communicate with remote server 125 to receive complex jobs for processing on the otherwise idle vehicle processors of vehicles 105. Dispatcher 110 may be any suitable computer, such as computing device 700 as depicted with respect to FIG. 7.

User devices 120 may be the user devices 120 of the vehicle 105 owner/drivers. The user devices 120 may have a user interface provided by dispatcher 110 for exchanging information about the vehicle 105 associated with the user device 120. An example graphical user interface 405 is described with respect to FIG. 4. The user device 120 may receive charging information for the associated vehicle 120 and provide information such as payment information for the parking and/or charging services used at the charging/parking station 115. The owner/driver may also provide consent for dispatcher 110 to utilize the vehicle processors of the associated vehicle 105 with the user device 120 via the graphical user interface. The user devices 120 may be mobile devices and may be, for example, smartphones, tablets, or any other suitable computing device such as computing device 700 as depicted with respect to FIG. 7.

Remote server 125 may be a server (e.g., computing device 700 as depicted with respect to FIG. 7), such as a cloud server, that provides a portal for requestors 130 to request complex computational jobs be completed. Remote server 125 may transmit the complex jobs to the dispatcher 110 for completion by the vehicle processors of vehicles 105. While a single remote server 125 is depicted, there may be multiple remote servers 125 including, for example, a server farm or distributed computing system that processes requests from requestors 130. Requests for complex tasks may include any task that is iterative and that can be run in parallel such as, for example, cryptocurrency mining, machine learning (e.g., training a neural network), frequency analysis, or the like. There may be any number of requestors 130 as depicted by requestor 130a through 130n. Requestors 130 may be any person or entity that needs a complex job completed by high performance computational processors. Requestors 130 may interface with remote server 125 via, for example, a graphical user interface that provides information about the request, time to completion, and so forth including information provided by dispatcher 110 to remote server 125 about the job. In some embodiments, requestors 130 may interface with remote server 125 in such a way that allows interaction with dispatcher 110 directly via, for example, a graphical user interface provided by user interface subsystem 150.

Within dispatcher 110, there are several components/subsystems depicted for ease of description of the functionality provided by dispatcher 110. The components depicted are not intended to limit the scope of the disclosure. Rather, the functionality described may be implemented in more or fewer subsystems within dispatcher 110. As depicted, dispatcher 110 includes data intake subsystem 135, job parsing subsystem 140, prioritization and distribution subsystem 145, and user interface subsystem 150. The subsystems may be stored in memory and comprise instructions that may be executed by a processor for performing the described functionality.

Figure 2:
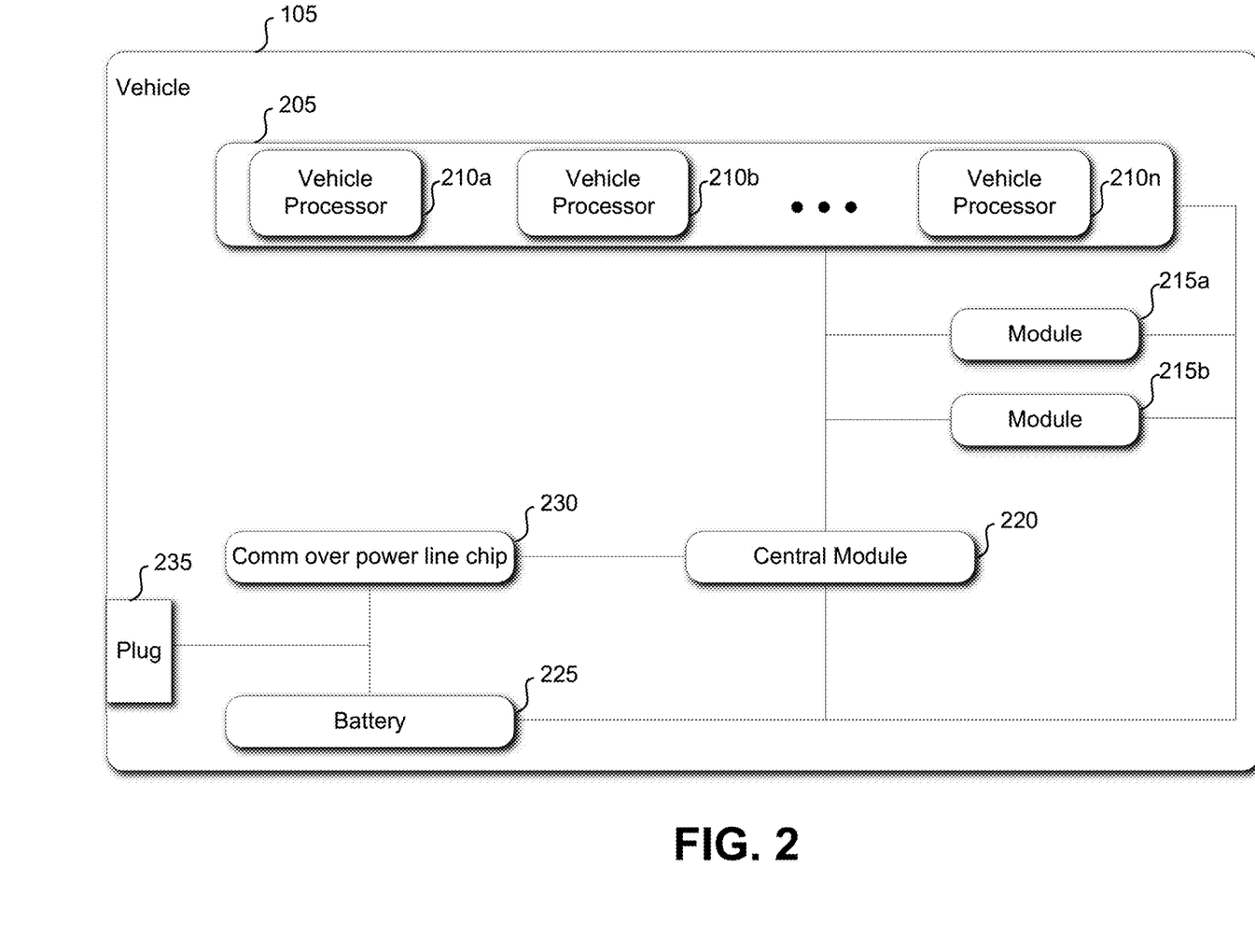
FIG. 2 illustrates an example of a vehicle with high performance computing capabilities, according to some embodiments.

Data intake subsystem 135 may receive information regarding the complex jobs requested by requestors 130 from remote server 125. The data intake subsystem 135 may receive the jobs and store job information into a memory or storage space (not shown) of the dispatcher 110. Additionally, the data intake subsystem 135 may receive vehicle processor information for each vehicle processor in the vehicles 105. For example, vehicle 105a may have two high performance processors, so the information regarding each of the two vehicle processors of vehicle 105a may be provided to dispatcher 110 and received by data intake subsystem 135. The information for each vehicle processor may include information regarding the individual processor as well as the associated vehicle and an association between each vehicle processor in a single vehicle (e.g., associations between vehicle processors 210a, 210b, and 210c all of vehicle 105). For example, the number of cores of the vehicle processor (i.e., computational power of the vehicle processor) as well as other characteristics of the processor such as the processing speed, a schedule of the vehicle processor (e.g., a schedule during which the processor is unavailable for jobs other than those of the internal vehicle) and so forth are provided to data intake subsystem 135. Additionally, the state of the vehicle charge (i.e., charge status) is provided to the data intake subsystem 135 for the associated vehicle. The data intake subsystem 135 may also receive information to associate a user device 120 with the vehicle 105. For example, if the owner/driver of vehicle 105a is the user of user device 120a, the user device 120a information may be provided to the data intake subsystem 135 for the dispatcher 110 to communicate information with the user device 120a.

Job parsing subsystem 140 may receive the complex job information from the data intake subsystem 135 and parse the job into tasks or subtasks. Each task or subtask can be executed in parallel with other tasks or subtasks by differing vehicle processors.

Prioritization and distribution subsystem 145 determines how to prioritize the tasks. For example, certain complex jobs may be prioritized over others based on the amount the requestor paid to have the job completed. Additionally, the tasks or subtasks may be prioritized based on any determination that some portions should be completed before others. Prioritization and distribution subsystem 145 may also determine how to distribute the tasks to the available vehicle processors. Prioritization and distribution subsystem 145 may prioritize vehicle processors based on the charge status of the vehicle and the computational power capabilities of the vehicle processors. For example, prioritization and distribution subsystem 145 may prioritize vehicles that have the most charge and/or vehicle processors with the most computational power. Prioritization and distribution subsystem 145 may use an optimization algorithm to maximize the computational power with the minimum power use. Prioritization and distribution subsystem 145 may transmit the tasks and/or subtasks to the vehicle processors as determined. In some embodiments, the dispatcher 110 communicates with the charging/parking stations 115 to distribute the tasks and subtasks to the designated vehicle processors in vehicles 105. Prioritization and distribution subsystem 145 receives the results from the vehicle processors (e.g., via the charging/parking station 115) and may combine and finalize all results to provide a result to remote server 125 for transmission to the appropriate requestor 130. In some situations, the vehicle processor node may disappear after a task has been sent to the vehicle processor because, for example, the owner/driver removed the vehicle 105 from the charging/parking station 115. In the case of a vehicle processor disappearing without returning results for a task or subtask, the prioritization and distribution subsystem 145 may redistribute the task to another vehicle processor. Once all tasks for a complex job are complete and the results returned to the prioritization and distribution subsystem 145, the dispatcher provides the results to the requestor 130 via the remote server 125.

In some embodiments, prioritization and distribution subsystem 145 may receive a higher priority job over one that is currently being processed by vehicle processors in vehicles 105. In such cases, prioritization and distribution subsystem 145 may halt the currently processing tasks for the first job and distribute new tasks associated with the higher priority job for the vehicle processors to complete while the old tasks are halted. Once the higher priority job is complete, the vehicle processors may resume the tasks from the first job based on instructions from the prioritization and distribution subsystem 145.

User interface subsystem 150 may provide a user interface to the user devices 120 based on the driver/owner associated vehicle 105. In some embodiments, the user may log into a system (e.g., an app or browser based application) to which the user device 120 is pre-registered and associated with the vehicle identification number (VIN) of vehicle 105. Examples of this type of system include, for example, FORDPASS®. Any user interface (e.g., web based or browser based application) available on the user device 120 for the vehicle 105 may register vehicle 105 with user device 120 by making an association by, for example, allowing the user to enter the VIN into the user interface. Dispatcher 110 may transmit a message to the vehicles 105 for the vehicle 105 having the VIN entered by the user to respond. Once the associated vehicle 105 is identified, the dispatcher 110 may transmit a message to appear, for example, on a display within vehicle 105, and the user may accept on the display in the vehicle 105 that the association is correct for the user device 120. Accordingly, dispatcher 110 may store the association between the user device 120 and the vehicle 105. The user interface subsystem 150 may request consent from the driver/owner of the associated vehicle 105 to use the vehicle processors of the vehicle 105. The user interface subsystem 150 may provide information about the charging state of the associated vehicle 105 including the amount of time the vehicle 105 has been charging and/or parked, the amount of time left before the vehicle 105 is fully charged, the cost of the parking and/or charging, and so forth. An example graphical user interface 405 is provided and described with respect to FIG. 4.

In use, vehicles 105 park within the parking spaces and/or parking garages overseen by dispatcher 110. In some embodiments, vehicles 105 park and pay at a parking station 115, in some embodiments vehicles 105 park at a charging station 115, or some combination of such for vehicles 105. The drivers/owners of vehicle 105 have user devices 120 which may be used to interface with dispatcher 110 and/or pay for parking/charging at charging/parking stations 115. Either wirelessly or via the charging cable, vehicle 105 may provide or respond with information about vehicle processors within vehicle 105 (note that each vehicle 105, e.g., 105a, 105b, 105c, and so forth, independently is represented and provides individual information) to charging/parking station 115. Charging/parking station 115 provides either wirelessly or via a hardwired connection, the information for the associated vehicle 105 to the dispatcher 110. Dispatcher 110 utilizes the data intake subsystem 135 to receive the vehicle processor information for each vehicle 105. Dispatcher 110 may store a table of available vehicle processors with associated information including the vehicle to which the vehicle is associated, the current charge of the vehicle to which the vehicle processor is associated, the computing power of the vehicle processor, and so forth in, for example, a local memory of dispatcher 110. The information associated with vehicles 105 may be updated periodically to maintain current and accurate information regarding available vehicle processors within dispatcher 110. Because, for example, vehicles 105 may arrive and leave regularly as well as the charging information for the vehicles 105 may change, the dispatcher 110 may request and/or receive updated information on vehicles 105 regularly. For example, each vehicle 105 may report the status to charging/parking station 115 on a periodic basis (e.g., every 1 second, every 10 seconds, every minute, every 5 minutes, or any other suitable time period).

Meanwhile, requestors 130 may be upload job requests to remote server 125. Remote server 125 may provide the job requests to dispatcher 110. Dispatcher 110 may use data intake subsystem 135 to receive the job information from remote server 125. Job parsing subsystem 140 may parse each job into tasks and/or subtasks to be completed by one or more vehicle processors. Prioritization and distribution subsystem 145 may prioritize the jobs, associated tasks, and available vehicle processors such that the completed jobs are successfully done as quickly and efficiently as possible. For example, prioritization and distribution subsystem 145 may identify the available vehicle processors that have a highest charge available in their associated vehicle 105 to complete the tasks quickly. Prioritization and distribution subsystem 145 may further prioritize the available vehicle processors by computing power to ensure the highest power available vehicle processors are used efficiently. Further, prioritization and distribution subsystem 145 may consider whether the vehicle 105 has been parked for a time period that may end soon. For example, if the vehicle historically has parked within the system, the dispatcher 110 may know that the vehicle 105 usually arrives at 8 am and leaves at 5 pm. Further, if the owner/driver of vehicle 105 has preselected and/or paid for a parking time period, the prioritization and distribution subsystem 145 may utilize the information to minimize the risk that a task or subtask is not sent to the vehicle processor for that vehicle 105 when the vehicle 105 is likely to leave because then the task must be redirected to a different available vehicle processor.

Before proceeding to utilize a vehicle processor of a vehicle 105, the dispatcher 110 may use user interface subsystem 150 to obtain consent from the driver/owner of vehicle 105 via the user device 120 of the vehicle owner/driver to utilize the vehicle 105 vehicle processor. Once the consent is received and the vehicle processor has been used to process one or more tasks, the dispatcher 110 may use user interface subsystem 150 to communicate with the owner/driver of vehicle 105 via user device 120 to indicate that parking and/or charging costs have been reduced or eliminated in exchange for the use of the vehicle processors. When the job is complete, prioritization and distribution subsystem 145 may finalize the results and send them to remote server 125 for transmission to the appropriate requestor 130. The requestor 130 may pay remote server 125 for the completion and results of the job. Remote server 125 may provide compensation to the dispatcher 110 for the services provided.

FIG. 2 illustrates an example vehicle 105. Not all components of vehicle 105 are included for ease of description and clarity. For example, vehicle 105 will include components needed for driving vehicle 105 including, for example, an engine or motor, wheels, accelerator pedal, brake pedal, and the like. As shown, vehicle 105 includes a processor cluster 205, processors 210, modules 215, central module 220, battery 225, chip 230, and plug 235. Further, vehicle 105 may include the components of a computing device including memory and the like such as computing device 700 as described with respect to FIG. 7.

Processor cluster 205 may include one or more processors 210. In some embodiments, vehicle 105 may include a single vehicle processor 210 and may include any number of processors 210 as depicted by processors 210a through 210n. Each vehicle processor 210 is a vehicle processor that may be used by the vehicle 105 during use of vehicle 105 for providing functionality to vehicle 105. For example, processors 210 may be graphic processing units (GPUs), field programmable gate arrays (FPGAs), multiply and accumulate (MAC) units, or any other high performance computational processors. Each vehicle processor 210 may be a different type of processor with different processing capabilities as the other processors 210 in vehicle 105. Central module 220 may manage and direct the processors 210 in processing cluster 205. In some embodiments, processors 210 each function independently without a central module 220. The processors 210 in vehicle 105 may be high performance computational processors, particularly for embodiments where vehicle 105 is a hybrid electric vehicle, an electric vehicle, or an autonomous vehicle. Vehicles 105 that are autonomous have particularly high performance computational processors for operating the vehicle 105 autonomously. For vehicles 105 that have a central module 220, the central module 220 may report for the vehicle processors 210 such that the dispatcher 110 or charging/parking station 115 believes vehicle 105 has a single vehicle processor and central module 220 may distribute the tasks received from the dispatcher 110 most efficiently within the vehicle to optimize energy use and computing power.

Modules 215 are other modules, such as electronic control units (ECUs) within vehicle 105 that may perform various specific functions of vehicle 105. Battery 225 may be the battery that provides power to vehicle 105 for vehicle 105 to function. For example, battery 225 may provide power to the processors 210 as well as to the motor (not shown) of vehicle 105. In some embodiments vehicle 105 may be an electric vehicle such that the motor is powered by battery 225. In some embodiments vehicle 105 may be a hybrid electric vehicle such that battery 225 powers the motor and may also provide the power to start the internal combustion engine portion of vehicle 105.

Chip 230 may be a chip that provides the necessary protocol conversion for communication packets to transmit and be received over a power line such as the charging cable for charging vehicle 105. The plug 235 may be the port provided to plug the charging cable into the vehicle 105 for charging the battery 225 and enabling communication via chip 230 over the charging cable. In some embodiments, chip 230, and/or the functionality to perform protocol conversion for communication packets may reside within central module 220 or another module rather than a separate chip 230, as shown in FIG. 2, without impacting the scope of this disclosure.

In use, the driver/owner may connect a charging cable 235 into plug 235 of vehicle 105. The charging cable may be coupled to charging/parking station 115. The power may begin to flow through the charging cable into battery 225 to charge battery 225. Further, a message from charging/parking station 115 may transmit via the charging cable through the plug 235 to chip 230. Chip 230 may translate and provide the message to central module 220 to, for example, request the details of processors 210 including each processor's computing power, current load and/or availability, and any other details such as the type of processor it is and the amount of power (charge from the battery) needed to use the processor. The central module 220 may provide the information for each processor in addition to the current charge state of battery 225 to chip 230 for transmitting to the charging/parking station 115. In some embodiments, the charging/parking station 115 may periodically request an update from central module 220. In some embodiments, central module 220 may provide an update periodically or upon a trigger such as a change of more than 5% of battery 225 charge.

Figure 3:
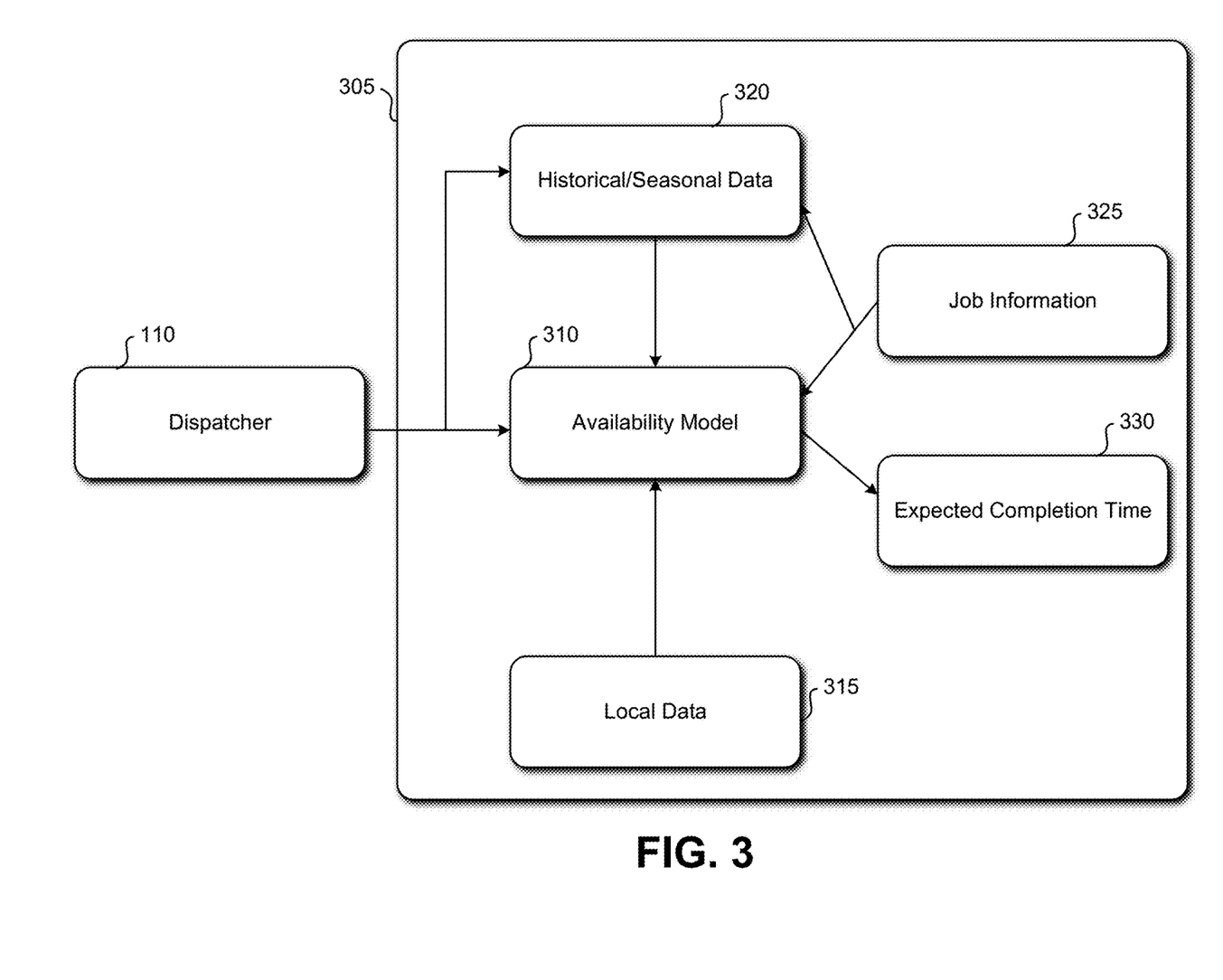
FIG. 3 illustrates an example of a modelling system, according to some embodiments.

FIG. 3 illustrates a prediction system 305 for generating a prediction of job completion. In some embodiments, the functionality in prediction system 205 may be incorporated into dispatcher 110. In some embodiments, prediction system 305 is a separate computing system such as computing device 700 as described with respect to FIG. 7. Dispatcher 110 may provide information to prediction system 305 regularly (e.g., daily, weekly, every hour, every minute, or any other time period) such that prediction system 305 may generate an availability model 310 for the vehicle processors that are available for processing jobs. The information may include the job information 325, historical seasonal data 320, and local data 315, for example. Local data 315 may include any information that may be used to identify an increase or decrease in availability of vehicle processors. For example, local construction may limit the number of vehicles entering the area, parking/charging station issues that may limit the number of parking/charging spaces, local events that may increase the number of vehicles in the area, and the like. As the information for completed jobs accumulates, including over changing seasons, the historical/seasonal data 320 may become more robust, particularly in combination with local data 315, and the availability model 310 may adjust and become more accurate for predicting expected completion time 330. In some embodiments, remote server 125 may request completion time from dispatcher 110. Dispatcher 110 may use the availability model 310 from prediction system 305 to generate an expected completion time 330 for the job. Dispatcher 110 may then provide the expected completion time 330 to the remote server 125 for transmission to the requestor 130.

Figure 4:
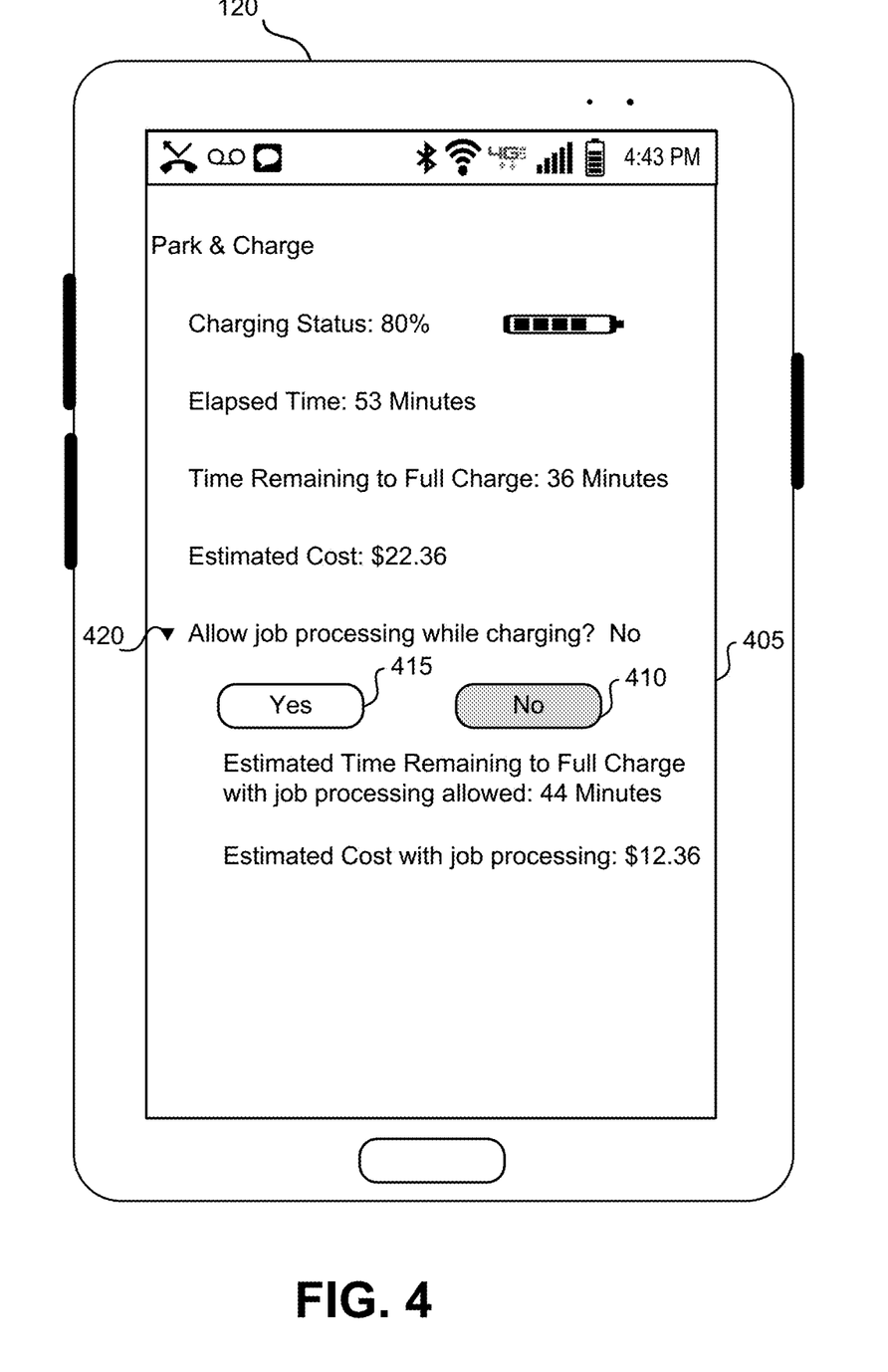
FIG. 4 illustrates an example of a graphical user interface, according to some embodiments.

FIG. 4 illustrates an example graphical user interface (GUI) 405 on user device 120 for communication between the owner/driver of vehicle 105 and the dispatcher 110 via the user interface subsystem 150. The GUI 405 may provide the charging status of the vehicle 105. The charging status may include the amount of charge the vehicle has (e.g., 80% full battery as shown in GUI 405), the elapsed time (e.g., 53 minutes as shown in GUI 405) that the vehicle has been charging, the time remaining to full charge (e.g., 36 minutes as shown in GUI 405), and the estimated cost for the charging (e.g., $22.36 as depicted in GUI 405).

Additionally, the GUI 405 may provide an option for the driver/owner to grant consent to use of the vehicle processors for processing jobs while the vehicle is parked and charging. Expansion arrow 420 may be clicked to expand the details of the driver/owner selection for consent to allow job processing while the vehicle is charging with the vehicle processors. As shown in GUI 405, the selection of "no" is provided as current, and the expanded options under expansion arrow 420 include a "yes" grant consent button 415 and a "no" deny consent button 410. The "no" deny consent button 410 is shaded, indicating the current selection. Should the owner/driver wish to grant consent for use of the vehicle processors for his associated vehicle, the owner/driver may select the "yes" grant consent button 415, and the dispatcher 110 may modify the information for available vehicle processors to include the vehicle processors of the associated vehicle. The user having previously granted consent may also revoke consent by selecting the "no" deny consent button 410 at any time. Additionally, under the expansion arrow 420 may include information regarding the amount of time to obtain a full charge if the consent is changed and the cost of the change of consent. In the example shown in GUI 405, the owner/driver may grant consent, and in doing so, according to the GUI 405, the estimated amount of time to attain a full charge would increase from the current 36 minutes to 44 minutes, for example. Additionally, the cost to charge the vehicle would reduce from $22.36 to $12.36, for example. In the scenario in which the owner/driver had granted consent previously, the estimated time remaining to full charge if the owner/driver revokes consent may reduce and the cost may increase. The values for the estimated cost adjustment and time to full charge adjustment may be calculated by dispatcher 110. In some embodiments, the prediction system 305 may be used to estimate the values for GUI 405 for each driver/owner for each vehicle 105 using user devices 120.

Figure 5:
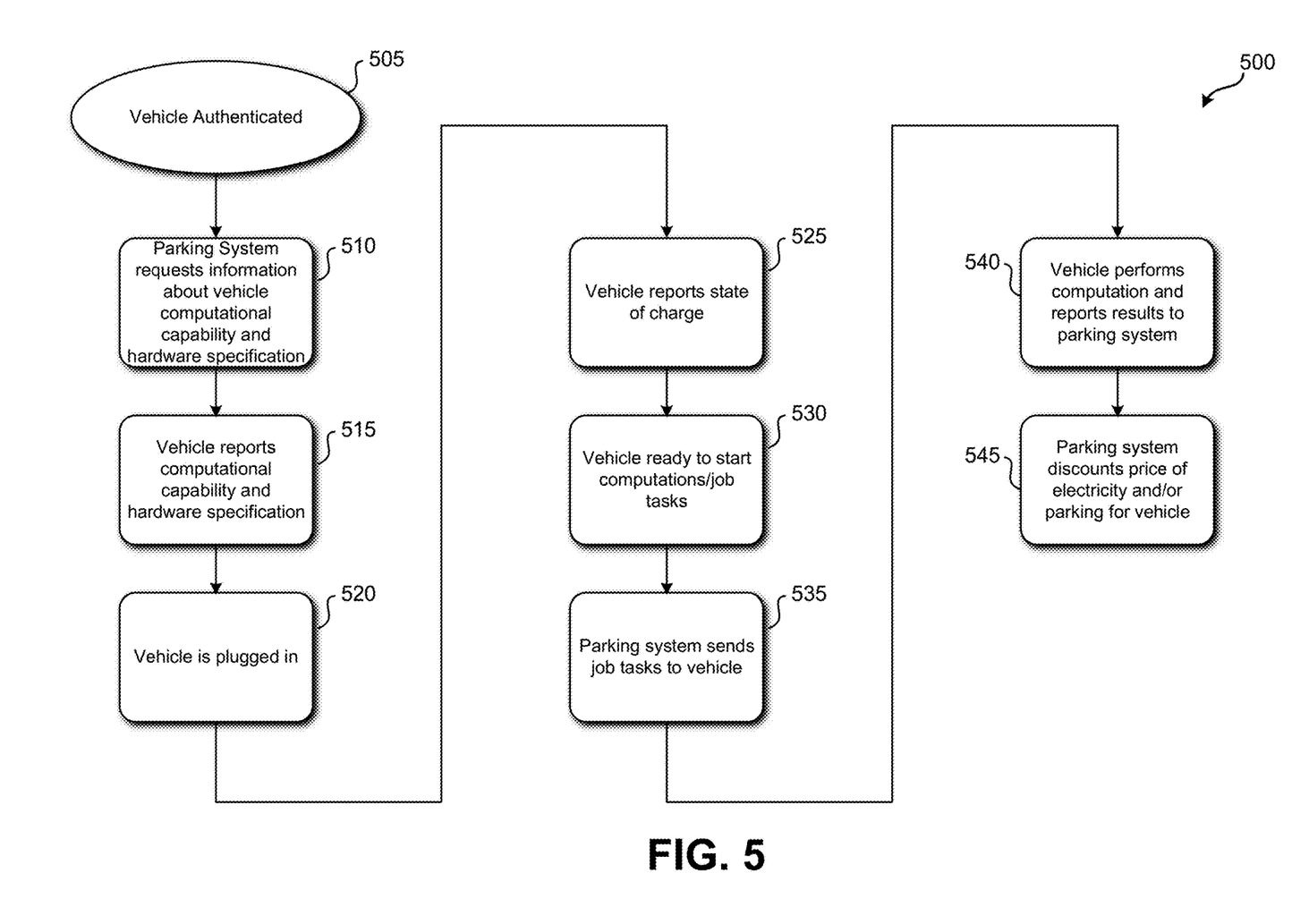
FIG. 5 illustrates an example of a process for harvesting vehicle processors, according to some embodiments.

FIG. 5 illustrates an example process 500 for harvesting vehicle processors (e.g., vehicle processors 210). The process 500 may be performed by harvesting system 100. The process 500 begins with the vehicle (e.g., vehicle 105) being authenticated at step 505. The vehicle may be authenticated via the charging/parking station (e.g., charging/parking station 115). In some embodiments, a secure, trusted channel is developed so that the infrastructure (e.g., parking/charging station 130 and/or dispatcher 110) can communicate with the vehicle 105 with guarantees the vehicle information is authenticated. In some embodiments, the infrastructure may partner with original equipment manufacturers (OEMs) (e.g., FORD®, GENERAL MOTORS®, TESLA®, and so forth) to build a secure, trusted channel of communication. In such embodiments, vehicles 105 may communicate with the OEM, and the OEM may communicate with the infrastructure. In such cases, the OEM may provide the authentication for the vehicle 105. Communication with the OEM for the vehicle 105 may be via a satellite communication, a wireless cellular communication, or via the infrastructure's network (either wired or wireless). As such, the vehicle 105 may communicate with the infrastructure using the OEM (e.g., an OEM cloud system) as a proxy. The OEM may identify the appropriate infrastructure system to communicate with based on the GPS signal of the vehicle 105.

The parking system (e.g., dispatcher 110 and/or charging parking station 115) may request information about the vehicle computational capability and hardware specifications at step 510. For example, the parking system may request the number of vehicle processors (e.g., vehicle processors 210) in the processor cluster (e.g., processor cluster 205) of the vehicle, details about each vehicle processor including the computational capability (e.g., number of cores), processing speed, energy consumption details for each vehicle processor, and so forth. The vehicle may report the requested details from step 510 at step 515. At step 520, the vehicle is plugged in. In some embodiments, the driver/owner may plug the vehicle in prior to step 510, the communication and information exchange of steps 510 and 515 may be performed via the charging cable, and at step 520 the charging cable begins providing a charge to the vehicle. At step 525, the vehicle may report the state of charge of the battery to the parking system. At step 530, the vehicle may be prepared to start computations or job tasks. At step 535, the parking system (e.g., dispatcher 110) may transmit one or more job tasks to the vehicle. For example, the parking system may send an entire job to the vehicle or one or more tasks of the job after parsing the job (e.g., by job parsing subsystem 140). The parking system may further prioritize the job tasks to utilize the vehicle processors in the most efficient manner including by taking account of the charge of the vehicle battery, the computational power of the available vehicle processors, and the amount of energy used by the vehicle processor to perform computations using, for example, prioritization and distribution subsystem 145. At step 540, the vehicle performs the one or more tasks (i.e., computations) and reports the results to the parking system (e.g., dispatcher 110). The parking system then discounts the price of the electricity for charging the vehicle and/or the price of parking for the vehicle at step 545. For example, using GUI 405 and/or user interface subsystem 150, the parking system may provide details of the cost and/or collect payment from the owner/driver of the vehicle for the parking and/or charging of the vehicle, reduced by the amount the parking system used the vehicle processors of the vehicle.

Figure 6:
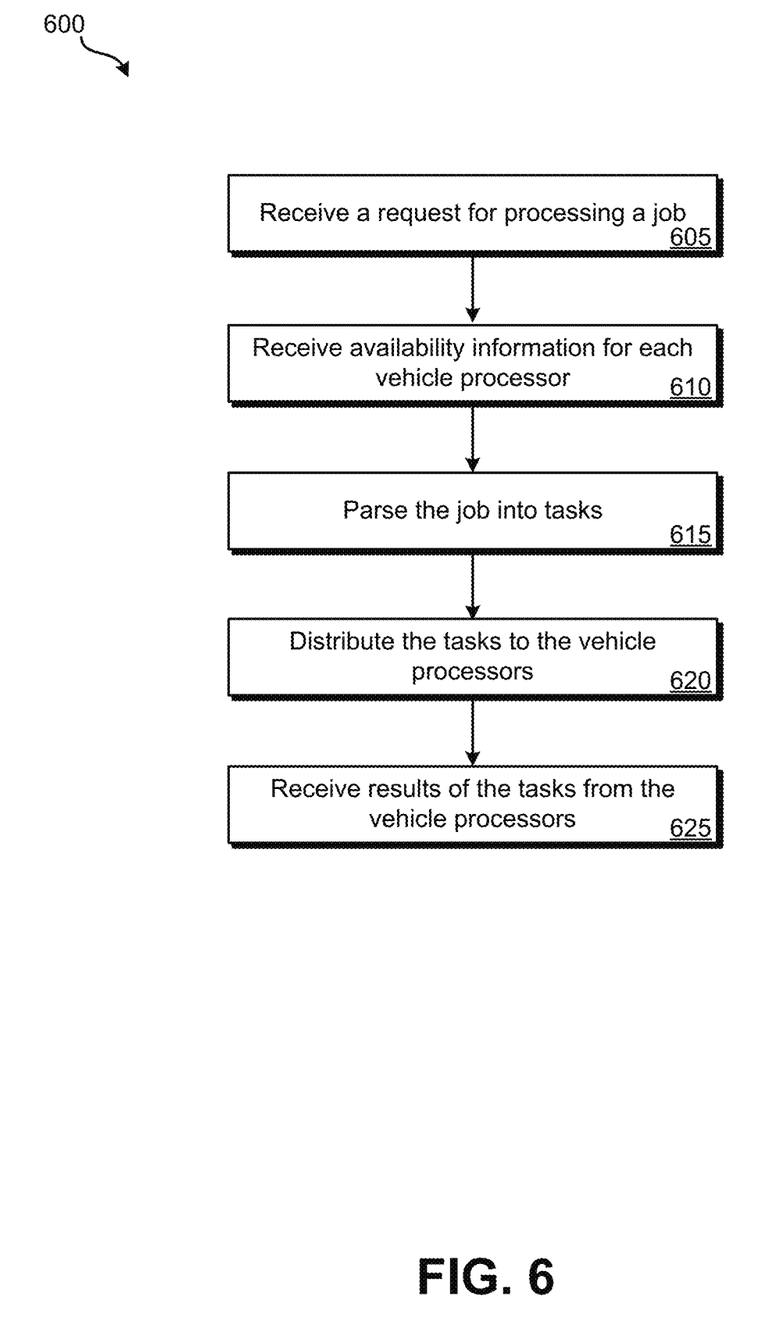
FIG. 6 illustrates another example of a process for harvesting vehicle processors, according to some embodiments.

FIG. 6 illustrates an example method 600 for harvesting vehicle processors (e.g., vehicle processors 210). The method 600 may be performed by, for example, dispatcher 110 as described with respect to FIG. 1. At step 605, the dispatcher may receive a request for processing a job. For example, a requestor 130 may request performance of some computations (i.e., a job) from remote server 125. The job may be any task that is iterative and that can be run in parallel such as, for example, cryptocurrency mining, machine learning (e.g., training a neural network), frequency analysis, or the like.

At step 610, the dispatcher may receive availability information for each vehicle processor. For example, dispatcher may have access to many vehicles, such as vehicles 105a through 105n as described with respect to FIG. 1. Each vehicle 105 may have one or more high power computational processors, such as vehicle processors 210 as described with respect to FIG. 2. The vehicles 105 may arrive and leave randomly, so each vehicle 105 may provide information about its vehicle processors 210 as it arrives, and the dispatcher 110 may, for example, periodically ping the vehicle 105 to ensure it is still part of the harvesting system 100. In some embodiments, a user interface, such as GUI 405 may allow a driver/owner to provide or decline consent for use of the vehicle processors of the vehicle to be used for processing other jobs. The user interface subsystem 150 may be used to communicate with user devices 120 and associate the correct user device 120 with the associated vehicle 105. Further, dispatcher 110 may include each vehicle and associated vehicle processor in, for example, a local table that is updated frequently (e.g., every minute, every 5 minutes, every 15 minutes, upon a triggered change, and/or any combination of periodicity and triggering events). The local table may be stored, for example, in a volatile or non-volatile memory within dispatcher 110 or in a remote storage device. The local table may include, for example, information for each vehicle processor including, for example, the hardware specifications, whether the owner/driver has consented to use, the battery charge of the associated vehicle, associations between any additional vehicle processors in the vehicle, and the like. In some embodiments, vehicles, such as vehicle 105, may have a central module 220, such that the central module 220 may handle dispatching tasks within the vehicle 105 to each vehicle processor 210, and the central module 220 reports to the dispatcher 110 a single processor 210. The vehicle processor reported by the central module 220 may, in some embodiments, be combination of the computing power of the available vehicle processors 210 for those vehicle processors 210 that are available to be used for the tasks from the dispatcher 110. Additionally, the power consumption and specification details of the vehicle processor reported by central module 220 may be an average, for example, of the specifications of the available vehicle processors 210.

At step 615, the dispatcher parses the job received at step 605 into tasks. For example, job parsing subsystem 140 may parse the job into tasks. As previously described, the job may be any task that is iterative and that can be run in parallel. Accordingly, the job parsing subsystem may parse the job into iterations of the task or into subtasks. The task or subtask may be any calculation or combination of calculations that can be performed by a high performance processing unit such that the calculation or combination of calculations may be performed in parallel with other calculations or combination of calculations from the job.

At step 620, the dispatcher may distribute the tasks to the vehicle processors. For example, prioritization and distribution subsystem 145 may prioritize the tasks and/or the vehicle processors 210 to distribute the tasks of the job to one or more vehicle processors 210. In some embodiments, the job may be quite large and may be parsed into many tasks and/or subtasks that may be distributed to many vehicles and their associated vehicle processors. In some embodiments, the job may be parsed into many tasks and/or subtasks that may distributed to only a few vehicles and their associated processors. The distribution is based on, for example, the amount of vehicle charge, the amount of power needed to perform calculations by the vehicle processor, the number of cores of the processor, the number of available vehicle processors for completing the tasks and/or subtasks of the job, and so forth. The prioritization and distribution subsystem 145 prioritizes the tasks and vehicle processors for distribution to attain optimal processing for the least power usage.

At step 625, the dispatcher may receive the results of the tasks from the vehicle processors. In some embodiments, the vehicle processors report the task results as completed and the dispatcher waits to receive all of the results before completing and finalizing the results for the job. In some embodiments, a node (i.e., vehicle processor) that is performing calculations of a task or subtask may disappear (e.g., the owner/driver retrieved the vehicle). To avoid a locked or incomplete job, the dispatcher may ping a node if the results are not received within a threshold time period after expected. If the node does not respond to the ping, the dispatcher may redistribute the incomplete task or subtask to another vehicle processor. Once the results are returned, the dispatcher may provide the results to the remote server 125 for transmission to the requestor 130.

Examples of Computing Environments for Implementing Certain Embodiments

Figure 7:
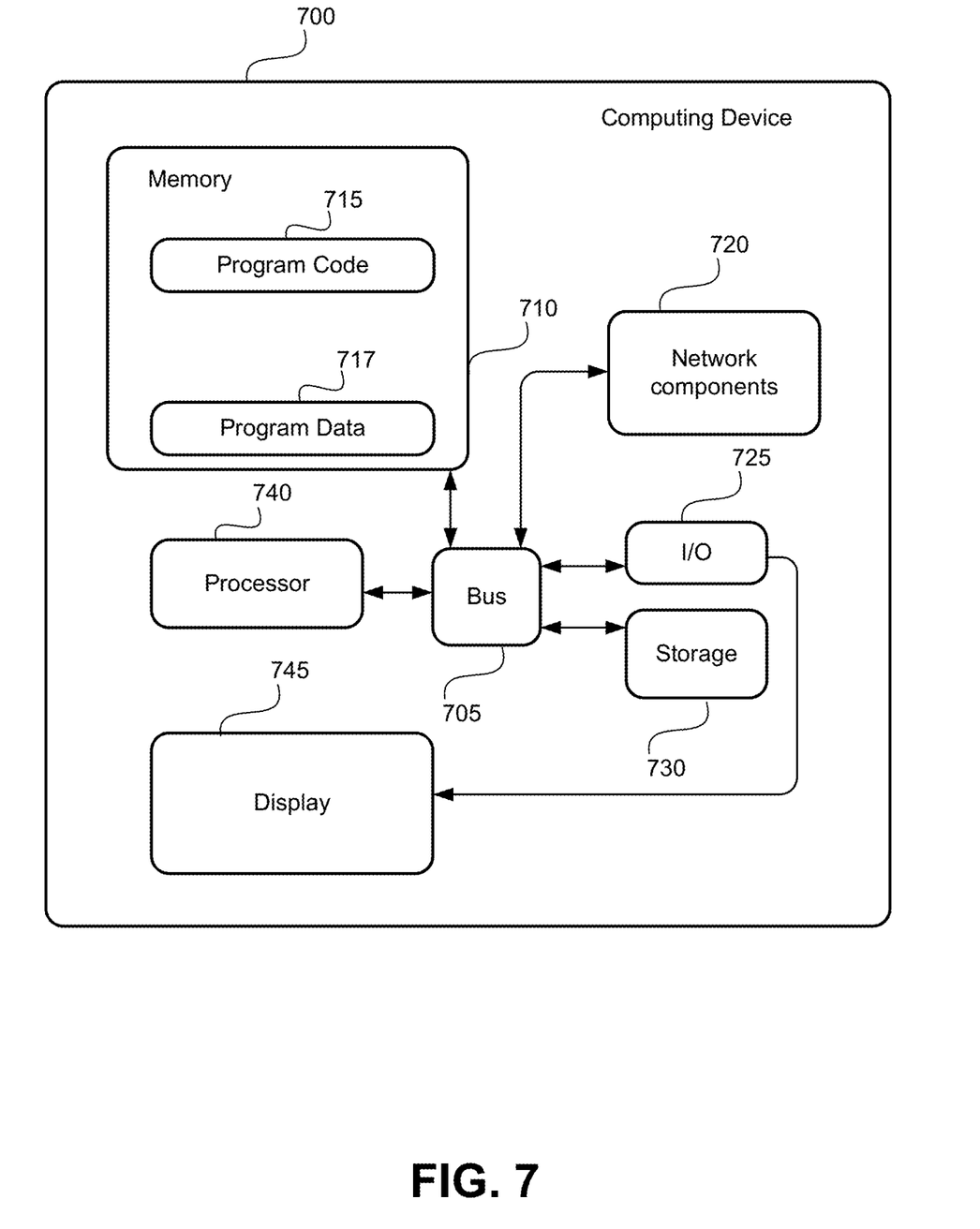
FIG. 7 illustrates a computer system, according to some embodiments.
Figure 8:
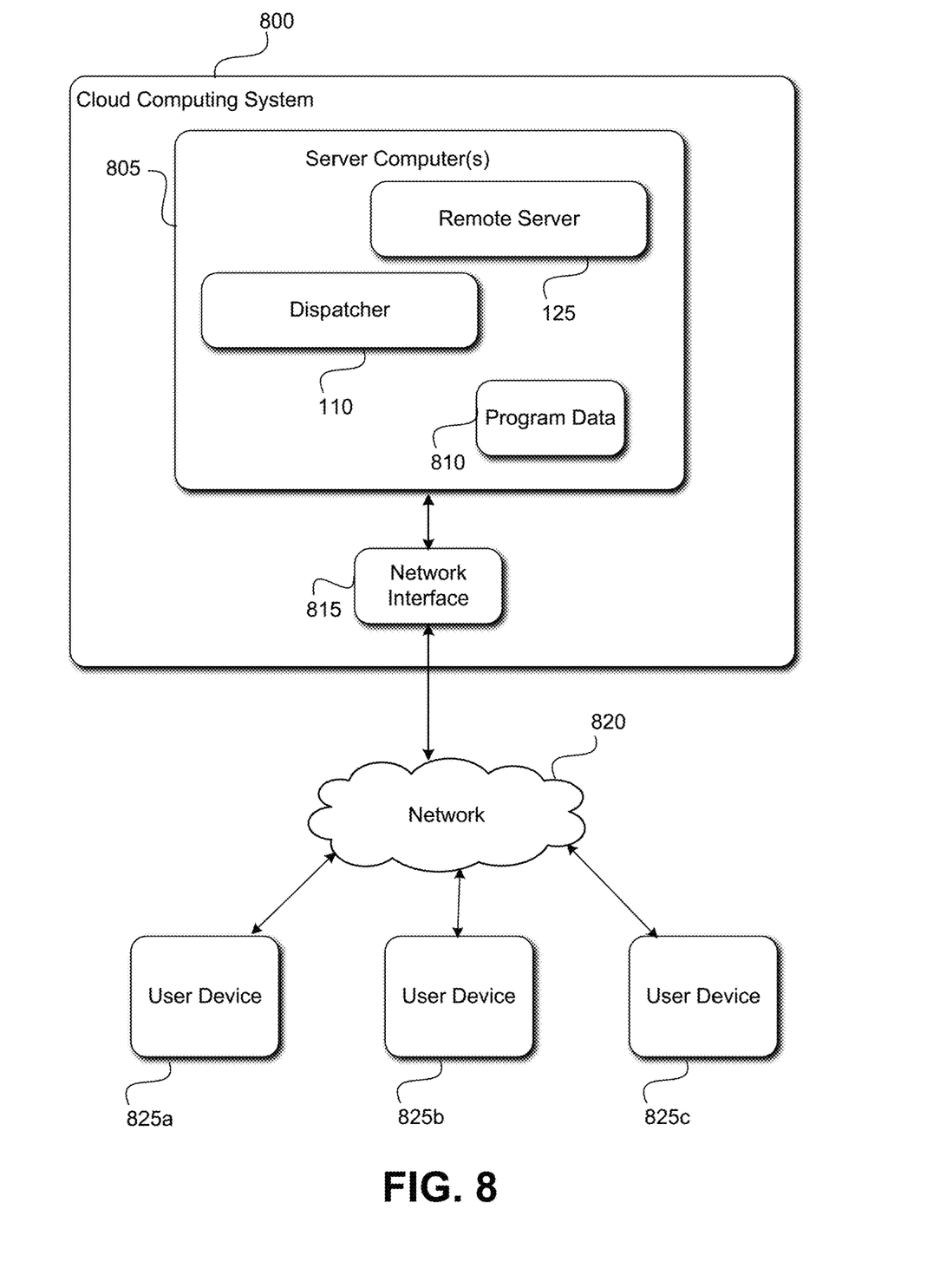
FIG. 8 illustrates a cloud computing system, according to some embodiments.

Any suitable computing system or group of computing systems can be used for performing the operations described herein. For example, FIG. 8 illustrates a cloud computing system 800 by which at least a portion of the functionality of dispatcher 110 may be offered. FIG. 7 depicts an example of a computing device 700 that may be at least a portion of vehicle 105 and/or dispatcher 110. The implementation of the computing device 700 could be used for one or more of the subsystems depicted in FIG. 1. In an embodiment, a single vehicle 105 or dispatcher 110 having devices similar to those depicted in FIG. 7 (e.g., a processor, a memory, etc.) combines the one or more operations and data stores depicted as separate subsystems in FIG. 1.

FIG. 7 illustrates a block diagram of an example of a computer system 700. Computer system 700 can be any of the described computers herein including, for example, dispatcher 110 or a computer within vehicle 105. The computing device 700 can be or include, for example, an integrated computer, a laptop computer, desktop computer, tablet, server, a smartphone, or any other electronic computing device.

The computing device 700 can include a processor 740 interfaced with other hardware via a bus 705. A memory 710, which can include any suitable tangible (and non-transitory) computer readable medium, such as RAM, ROM, EEPROM, or the like, can embody program components (e.g., program code 715) that configure operation of the computing device 600. Memory 610 can store the program code 715, program data 717, or both. In some examples, the computing device 700 can include input/output ("I/O") interface components 725 (e.g., for interfacing with a display 745, keyboard, mouse, and the like) and additional storage 730.

The computing device 700 executes program code 715 that configures the processor 740 to perform one or more of the operations described herein. Examples of the program code 715 include, in various embodiments, data intake subsystem 135, job parsing subsystem 140, prioritization and distribution subsystem 145, user interface subsystem 150, or any other suitable systems or subsystems that perform one or more operations described herein (e.g., one or more development systems for configuring an interactive user interface). The program code 715 may be resident in the memory 710 or any suitable computer-readable medium and may be executed by the processor 740 or any other suitable processor.

The computing device 700 may generate or receive program data 717 by virtue of executing the program code 715. For example, the local table having vehicle processor availability information is an example of program data 717 that may be used by the computing device 700 during execution of the program code 715.

The computing device 700 can include network components 720. Network components 720 can represent one or more of any components that facilitate a network connection. In some examples, the network components 720 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 720 can be wired and can include interfaces such as Ethernet, USB, or IEEE 1394.

Although FIG. 7 depicts a single computing device 700 with a single processor 740, the system can include any number of computing devices 700 and any number of processors 740. For example, multiple computing devices 700 or multiple processors 740 can be distributed over a wired or wireless network (e.g., a Wide Area Network, Local Area Network, or the Internet). The multiple computing devices 700 or multiple processors 740 can perform any of the steps of the present disclosure individually or in coordination with one another.

In some embodiments, the functionality provided by the harvesting system 100 may be offered as cloud services by a cloud service provider. For example, FIG. 8 depicts an example of a cloud computing system 800 offering an harvesting service that can be used by a number of user subscribers using user devices 825a, 825b, and 825c across a data network 820. User devices 825a, 825b, and 825c could be examples of a vehicle 105 described above. In the example, the harvesting service may be offered under a Software as a Service (SaaS) model. One or more users may subscribe to the harvesting service, and the cloud computing system performs the processing to provide the harvesting service to subscribers. The cloud computing system may include one or more remote server computers 805. The remote server computers 805 may include, for example, dispatcher 110 and/or remote server/cloud 125 as described with respect to FIG. 1.

The remote server computers 805 include any suitable non-transitory computer-readable medium for storing program code (e.g., dispatcher 110) and program data 810, or both, which is used by the cloud computing system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 805 can include volatile memory, non-volatile memory, or a combination thereof.

One or more of the servers 805 execute the program code 810 that configures one or more processors of the server computers 805 to perform one or more of the operations that provide harvesting services, including the ability to utilize the dispatcher 110, and so forth, to perform harvesting services. As depicted in the embodiment in FIG. 8, the one or more servers 805 provide the services to perform harvesting services via the dispatcher 110. Any other suitable systems or subsystems that perform one or more operations described herein (e.g., one or more development systems for configuring an interactive user interface) can also be implemented by the cloud computing system 800.

In certain embodiments, the cloud computing system 800 may implement the services by executing program code and/or using program data 810, which may be resident in a memory device of the server computers 805 or any suitable computer-readable medium and may be executed by the processors of the server computers 805 or any other suitable processor.

In some embodiments, the program data 810 includes one or more datasets and models described herein. Examples of these datasets include availability model 310 and vehicle processor availability information, for example, within the local table of the dispatcher, etc. In some embodiments, one or more of data sets, models, and functions are stored in the same memory device. In additional or alternative embodiments, one or more of the programs, data sets, models, and functions described herein are stored in different memory devices accessible via the data network 815.

The cloud computing system 800 also includes a network interface device 815 that enable communications to and from cloud computing system 800. In certain embodiments, the network interface device 815 includes any device or group of devices suitable for establishing a wired or wireless data connection to the data networks 720. Non-limiting examples of the network interface device 815 include an Ethernet network adapter, a modem, and/or the like. The dispatcher 110 is able to communicate with the user devices 825a, 825b, and 825c via the data network 820 using the network interface device 815.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method for harvesting vehicle computational power capabilities while vehicle processors are idle, the method comprising:
   receiving, at a dispatcher having one or more processors, a request for processing a job from a requestor;
   receiving, at the dispatcher, availability information for a plurality of vehicle processors, the availability information comprising, for each vehicle processor, a number of cores of the vehicle processor and a state of charge of a vehicle comprising the vehicle processor, wherein the state of charge indicates whether the vehicle is plugged to a power source for charging;
   periodically receiving, by the dispatcher, information associated with the job, historic seasonal data, and local data indicating an increase or decrease in a number of available vehicle processors, wherein the local data includes a local event occurring on a specific day that impacts the number of available vehicle processors;
   generating, by the dispatcher, an availability model of the available vehicle processors for processing the job received from the requestor based on the received information associated with the job, the received historic seasonal data, and the received local data, wherein the availability model is updated periodically in view of the received information associated with the job, the received historic seasonal data, and the received local data thereby increasing reliability of the availability model;
   estimating, by the dispatcher, a completion time of the job using the availability model;
   transmitting, by the dispatcher, the estimated completion time to the requestor;
   parsing, by the dispatcher, the job into a plurality of tasks;
   prioritizing, by the dispatcher, the plurality of tasks based on at least information provided in the request for processing the job to obtain a plurality of prioritized tasks;
   prioritizing, by the dispatcher, the plurality of vehicle processors based on at least the availability information to obtain a plurality of prioritized vehicle processors;
   distributing, by the dispatcher, the plurality of prioritized tasks to one or more vehicle processors of the plurality of prioritized vehicle processors based at least in part on computational power and power usage among the plurality of prioritized vehicle processors; and
   receiving, by the dispatcher, results of the plurality of prioritized tasks from the one or more vehicle processors.

2. The method of claim 1, wherein the plurality of vehicle processors are distributed across a plurality of vehicles that are charging, and wherein communication between the dispatcher and the plurality of vehicles is at least partially via a charging cable.

3. The method of claim 1, wherein the vehicle processors comprise graphic processing units, multiply and accumulate units, or field programmable gate arrays.

4. The method of claim 1, wherein distributing, by the dispatcher, the plurality of tasks to one or more vehicle processors comprises:
   identifying, by the dispatcher, a first vehicle having a first vehicle processor of the plurality of vehicle processors to distribute one or more of the plurality of tasks to;

providing, by the dispatcher, a graphical user interface to a mobile device of a driver of the first vehicle, the graphical user interface comprising a request for access to the first vehicle processor; and receiving, by the dispatcher via the graphical user interface, consent from the driver of the first vehicle to access the first vehicle processor.

5. The method of claim 4, wherein the first vehicle is charging and communicating with the dispatcher via a charging cable, and wherein the graphical user interface further comprises an offer to reduce a cost of charging the first vehicle in exchange for access to the first vehicle processor.

6. The method of claim 4, wherein the first vehicle is charging, and wherein the graphical user interface further comprises a charging state of the first vehicle.

7. The method of claim 1, wherein the availability information further comprises, for each vehicle processor, a type of the vehicle processor, or a schedule of the vehicle processor.

8. The method of claim 1, wherein a first vehicle comprises at least two vehicle processors of the plurality of vehicle processors and a central module, and wherein the dispatcher receives the availability information for the at least two vehicle processors from the central module.

9. The method of claim 1, further comprising:
distributing, by the dispatcher, a first prioritized task to a first vehicle processor of a first vehicle;
estimating, by the dispatcher, one or more parameters associated with the first prioritized task and the first vehicle; and
transmitting, by the dispatcher, the one or more parameters to a graphical user interface (GUI) associated with the first vehicle for the one or more parameters to be displayed on the GUI.

10. The method of claim 9, wherein the one or more parameters include a charging status of the first vehicle, a remaining time to a full charge state, or an estimated time remaining to the full charge state with job processing.

11. The method of claim 1, further comprising:
detecting, by the dispatcher, that a first vehicle processor of the plurality of vehicle processors ceased communication with the dispatcher, wherein a first task of the plurality of tasks was distributed to the first vehicle processor, and wherein the first vehicle processor did not complete the first task before ceasing communication; and
redistributing the first task to a second vehicle processor of the plurality of vehicle processors.

12. The method of claim 1, further comprising:
halting, by the dispatcher, execution of a task on a first processor;
assigning, by the dispatcher, a new task to the first processor, the new task having a higher priority than a priority of the halted task;
determining, by the dispatcher, that execution of the new task is complete;
resuming, by the dispatcher, execution of the halted task on the first processor.

13. A dispatcher for harvesting vehicle computational power capabilities while charging, the dispatcher comprising:
one or more processors; and
a memory, having stored thereon instructions that, upon execution by the one or more processors, cause the one or more processors to:
receive a request for processing a job from a requestor;
receive availability information for a plurality of vehicle processors, the availability information comprising, for each vehicle processor, a number of cores of the vehicle processor and a state of charge of a vehicle comprising the vehicle processor, wherein the state of charge indicates whether the vehicle is plugged to a power source for charging;
periodically receive information associated with the job, historic seasonal data, and local data indicating an increase or decrease in a number of available vehicle processors, wherein the local data includes a local event occurring on a specific day that impacts the number of available vehicle processors;
generate an availability model of the available vehicle processors for processing the job received from the requestor based on the received information associated with the job, the received historic seasonal data, and the received local data, wherein the availability model is updated periodically in view of the received information associated with the job, the received historic seasonal data, and the received local data thereby increasing reliability of the availability model;
estimate a completion time of the job using the availability model;
transmit the estimated completion time to the requestor;
parse the job into a plurality of tasks;
prioritize the plurality of tasks based on at least information provided in the request for processing the job to obtain a plurality of prioritized tasks;
prioritize the plurality of vehicle processors based on at least the availability information to obtain a plurality of prioritized vehicle processors;
distribute the plurality of prioritized tasks to one or more vehicle processors of the plurality of prioritized vehicle processors based at least in part on a computational power and a power usage among the plurality of prioritized vehicle processors; and
receive results of the plurality of prioritized tasks from the one or more vehicle processors.

14. The dispatcher of claim 13, wherein the plurality of vehicle processors are distributed across a plurality of vehicles that are charging, and wherein communication between the dispatcher and the plurality of vehicles is at least partially via a charging cable.

15. The dispatcher of claim 13, wherein the vehicle processors comprise graphic processing units, multiply and accumulate units, or field programmable gate arrays.

16. The dispatcher of claim 13, wherein the instructions to distribute the plurality of tasks to one or more vehicle processors comprises instructions that, upon execution by the one or more processors, cause the one or more processors to:
identify a first vehicle having a first vehicle processor of the plurality of vehicle processors to distribute one or more of the plurality of tasks to;
provide a graphical user interface to a mobile device of a driver of the first vehicle, the graphical user interface comprising a request for access to the first vehicle processor; and
receive, via the graphical user interface, consent from the driver of the first vehicle to access the first vehicle processor.

17. The dispatcher of claim 16, wherein the graphical user interface further comprises an offer to reduce a cost of charging the first vehicle in exchange for access to the first vehicle processor.

18. The dispatcher of claim 16, wherein the graphical user interface further comprises an indication of a charging state of the first vehicle.

19. The dispatcher of claim 13, wherein the availability information further comprises, for each vehicle processor, a type of the vehicle processor, a schedule of the vehicle processor.

\* \* \* \* \*